United States Patent [19]
Reichardt

[11] Patent Number: 5,726,432
[45] Date of Patent: Mar. 10, 1998

[54] CONTACTING SYSTEM OR READER FOR CHIP CARDS

[75] Inventor: Manfred Reichardt, Weinsberg, Germany

[73] Assignee: Amphenol-Tuchel Electronics GmbH, Heilbronn, Germany

[21] Appl. No.: 537,745

[22] PCT Filed: May 16, 1994

[86] PCT No.: PCT/EP94/01579

§ 371 Date: Nov. 14, 1995

§ 102(e) Date: Nov. 14, 1995

[87] PCT Pub. No.: WO94/27243

PCT Pub. Date: Nov. 24, 1994

[30] Foreign Application Priority Data

May 14, 1993 [DE] Germany ............... 43 16 304.1

[51] Int. Cl.$^6$ ............... G06K 7/06; G06K 7/00; G06K 19/06; H01R 13/62
[52] U.S. Cl. ............... 235/441; 235/492; 235/486; 235/482; 439/493; 439/152
[58] Field of Search ............... 235/441, 492, 235/486; 439/493, 495, 67

[56] References Cited

U.S. PATENT DOCUMENTS

| | | | |
|---|---|---|---|
| 3,917,372 | 11/1975 | Selinko | 339/75 M |
| 3,999,826 | 12/1976 | Yurtin | 439/495 |

(List continued on next page.)

FOREIGN PATENT DOCUMENTS

| | | |
|---|---|---|
| 0 139 593 | 5/1985 | European Pat. Off. . |
| 0 167 356 | 1/1986 | European Pat. Off. . |
| 0 186 737 | 7/1986 | European Pat. Off. . |
| 0 214 478 | 3/1987 | European Pat. Off. . |
| 0 240 710 | 3/1987 | European Pat. Off. ..... H01R 9/09 |
| 0 234 654 | 9/1987 | European Pat. Off. . |
| 0 254 316 | 1/1988 | European Pat. Off. . |
| 0 274 534 | 7/1988 | European Pat. Off. . |
| 0 316 699 | 5/1989 | European Pat. Off. . |
| 0 333 530 | 9/1989 | European Pat. Off. . |
| 4 472 420 | 2/1992 | European Pat. Off. . |
| 2 400 820 | 3/1979 | France . |
| 2 489 558 | 3/1982 | France . |
| 2 554 977 | 5/1985 | France . |
| 2 607 287 | 5/1988 | France . |
| 2 633 750 | 1/1990 | France . |
| 24 30 944 | 1/1975 | Germany ............... G06F 3/02 |
| 24 33 843 | 2/1976 | Germany ............... H05K 3/32 |
| 2952442 A1 | 7/1980 | Germany . |
| 3343727 A1 | 6/1985 | Germany . |
| 3343757 A1 | 6/1985 | Germany . |
| 3402632 A1 | 8/1985 | Germany . |
| 3443561 A1 | 5/1986 | Germany . |
| 3531318 A1 | 3/1987 | Germany . |
| 3602668 A1 | 7/1987 | Germany . |
| 3625306 A1 | 1/1988 | Germany . |
| 3442397 A1 | 5/1988 | Germany . |
| 38 08 183 | 9/1988 | Germany . |
| 3810275 A1 | 10/1989 | Germany . |
| 3832588 A1 | 3/1990 | Germany . |
| 3931506 A1 | 4/1991 | Germany . |

OTHER PUBLICATIONS

Abstract of Japanese Published Pat. Appln. No. 60–022795, *Patent Abstracts of Japan*, Feb. 5, 1985.

Decker Maschineiemente, 9th Edition, pp. 92–94.

IBM Technical Disclosure Bulletin, vol. 20, No. 5, Oct. 1977, "Actuator Assembly for a Disk File".

*Primary Examiner*—Donald T. Hajec
*Assistant Examiner*—Douglas X. Rodriguez

[57] ABSTRACT

A flexible circuit board is used to provide the contact elements of a chip card reader. The contact area of the contact elements is obtained by deforming the flexible circuit board into cusps, with a contacting force being applied to the cusps by a single spring element. The flexible circuit board can be folded along a line which is either transverse or parallel to the card insertion direction in order to enable engagement of contact elements with both sides of the card.

16 Claims, 12 Drawing Sheets

U.S. PATENT DOCUMENTS

| | | | |
|---|---|---|---|
| 4,169,641 | 10/1979 | Olsson | 439/493 |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassi et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,874,323 | 10/1989 | Shibana | 439/260 |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/260 |
| 5,161,992 | 11/1992 | Birch | 439/260 |
| 5,196,680 | 3/1993 | Schuder | 235/449 |
| 5,219,292 | 6/1993 | Dickinson et al. | 439/495 |
| 5,228,862 | 7/1993 | Baumberger et al. | 439/493 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |
| 5,372,512 | 12/1994 | Wilson et al. | 429/403 |
| 5,433,632 | 7/1995 | Cherney et al. | 439/495 |

CONTACTING SYSTEM OR READER FOR CHIP CARDS

BACKGROUND OF THE INVENTION

1. Field of the Invention

The invention relates to a contacting system in particular for cards containing a chip, e.g. chip cards or SIM-cards.

2. Description of Related Arts

Chip card contacting systems (which are also simply called chip card readers) are known in many forms; attention is drawn for instance to U.S. Pat. No. 4,795,897, EP 0 234 654 and FR 86 02 401. The present invention intends in particular to provide a contacting system which is extremely inexpensive and which is suitable for realizing component groups which are particularly flat as is required for mobile telephones. Moreover, the invention has the object to arrange larger tolerances for the distance in the case of sandwich designs of the chip card reader.

Particularly in the area of PCM mobile telephones, there is a fast increasing need for contacting apparatus for chip cards or the like. This means that there is an increasing desire for low-cost contacting systems so that the costs of the apparatus using the contacting system remain favourable.

As a rule, the low cost CCAD is similar to the classic direct connector but the materials and methods used therefore have too high cost.

SUMMARY OF THE INVENTION

In a first aspect of the invention a flexible circuit board (flex print) is used for realizing the contact elements of a reader, for instance, a chip card reader. Inasmuch as the flexible circuit board is, generally speaking, a foil or film, the reader created in this manner can also be referred to as a "foil connector". In the contact area a cover foil of the flexible circuit board is interrupted. Preferably, a Cu conductor path of the flexible circuit board is deformed into a cusp and is coated with an appropriate noble metal. The contacting force is provided by a spring element which is preferably of single piece or integral design. Said contacting force will only be applied if the card is in a reading position in said contacting apparatus.

By using the features of the invention, the following will result:

Contact resistances due to contact springs will not exist.

If said flexible circuit board or foils are used and are coated with metal on both sides, then a chip adjacent said foil is shielded over its surface.

As is customary, contacting can occur at the termination side of the foil. In SMT (surface mounted technology) groups of components only the foil connector needs to be exposed to the heat of soldering.

Poliflexfoils can also be directly soldered.

In accordance with another aspect of the invention, the inventive principle can also be used for readers designed for transverse insertion of the card.

Further, readers with any desirable direction of insertion can be realized in accordance with a second and third aspect of the invention. For this purpose the flexible circuit board comprises preferably four contact fields, each two at the upper side and at the bottom side of the card. Moreover, this feature concerns only the contact less card. Also, a minimum height for the foil reader can be realized.

By special design of a pressure applying spring element, a larger balance of the height for making contact can be realized. This feature is particularly decisive, if the contacting system or unit is formed by two groups of components, the distance of which has larger tolerances. An example is the arrangement of the reader between the housing of the telephone and the battery pack of the telephone.

Further aspects of the present invention will be seen from the following description. Also, further advantages, objects and details of the invention can be gathered from the description of embodiments of the invention in connection with the drawing.

DETAILED DESCRIPTION OF THE PREFERRED EMBODIMENTS

Figure 1:
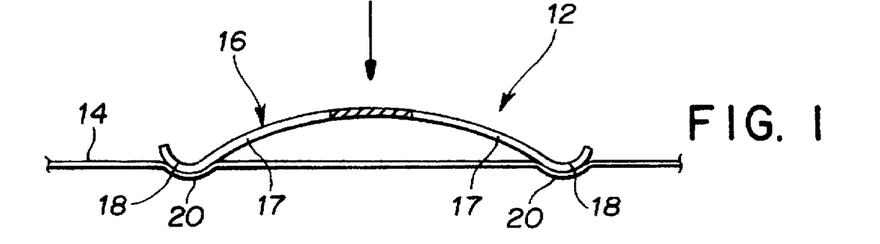
FIG. 1 is a schematic sectional view of a part of a contacting system of the invention of FIG. 2 in accordance with a first aspect of the invention.
Figure 2:
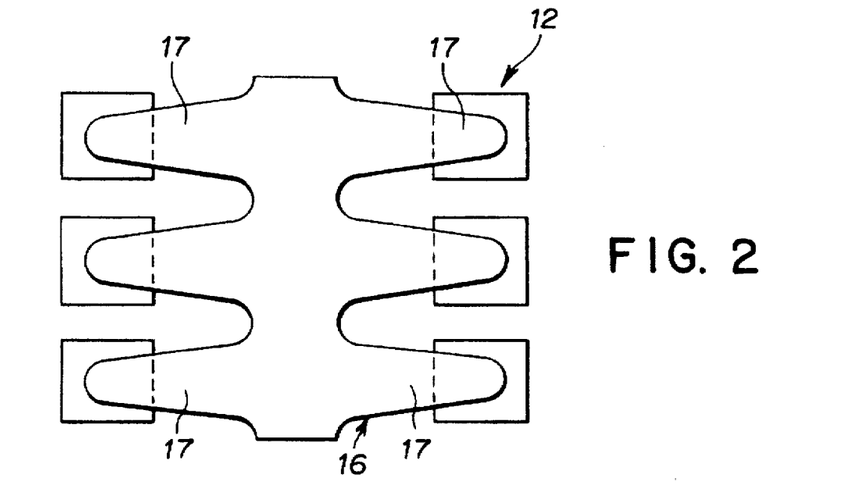
FIG. 2 is a schematic plan view of the contacting system of FIG. 1.
Figure 3:
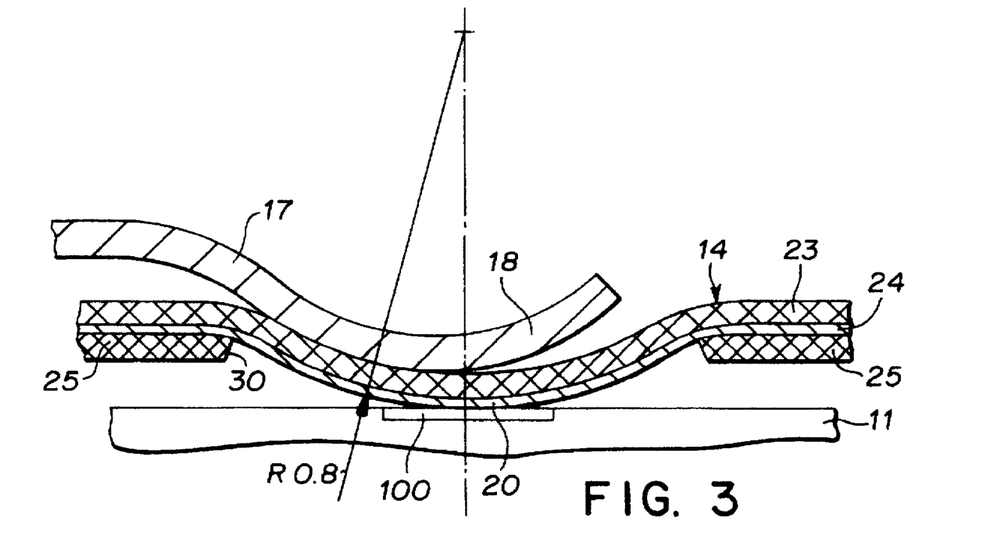
FIG. 3 is a detail of the contacting system of FIGS. 1 and 2.
Figures 4, 5:
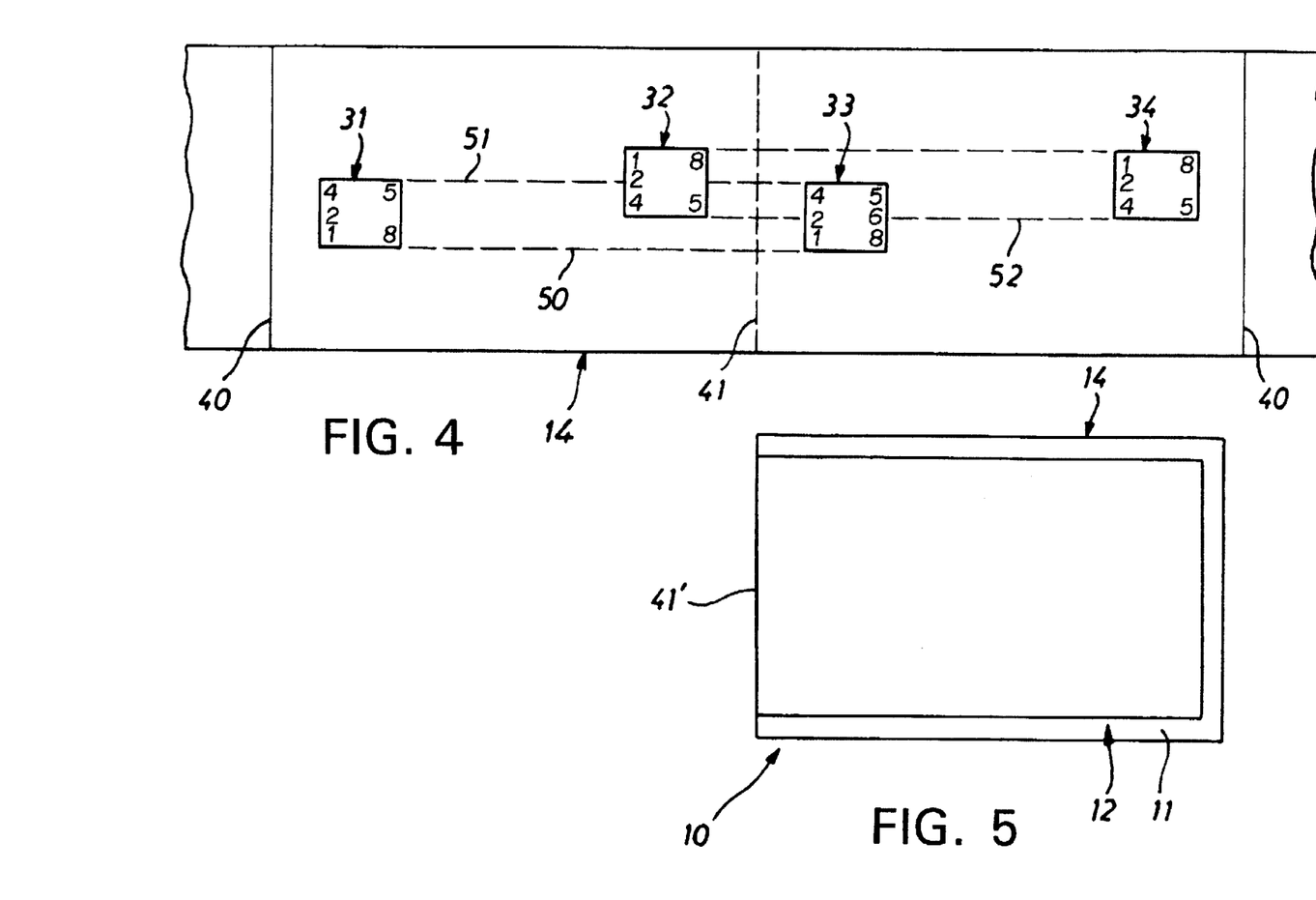
FIG. 4 is a schematic plan view of a flexible circuit board for realizing a second aspect of the invention.
FIG. 5 is a schematic plan view of the folded circuit board of FIG. 4 for forming a universal chip card reader in accordance with the second aspect of the invention.

FIGS. 1 to 3 show schematically a portion of a contacting system 12 of the invention as it can be used in a chip card reader 10, for instance of the type shown in FIG. 5 for reading or contacting a chip card 11 inserted therein. The chip card 11 is not shown in FIGS. 1 and 2 but is shown in FIGS. 3 and 5.

The contacting system 12 of the invention comprises a flexible printed circuit board (also called a flex print) 14 which can be loaded or biased in a resilient manner by means of a spring element 16, preferably a one piece or integral spring element 16. The spring element 16 is preferably a sheet metal spring having the shape shown in FIGS. 1 and 2. The spring element 16 forms spring arms 17 and spring cusps 18. The spring cusps 18 cooperate in a manner shown in particular in FIG. 3 with the flexible circuit board 14. The spring cusps 18 thus press a cusp 20 of the circuit board 14 in the direction towards the chip card 11, and, when a chip card is inserted into the reading position of the chip card reader onto the card contacts 100 (FIG. 3) of the chip card 11.

As is shown in more detail in FIG. 3, the flexible circuit board 14 comprises preferably three layers of foils, i.e. a base foil 23, a copper foil 24 and a cover foil 25. The cover foil 25 is provided with a recess 30 at a location where the contacting cusp of the circuit board out of the contacting path has to formed. Below, when referring to FIGS. 18 through 20 another design of a flexible circuit board will be explained.

FIG. 4 discloses a design of a flexible circuit board 14 in accordance with a second aspect of the invention. Here, the arrangment is such that a plurality of contact springs 31, 32, 33 and 34 are formed which each have contact areas which are numbered from 1 to 8. Said contact areas 1 to 8 can be formed or deformed by one or a plurality of spring elements 16, so as to shape the contact cusps 20 shown in FIG. 3. The arrangement of the contact areas 1 to 8 of each of the contact fields 31–34 corresponds to the arrangement of the card contacts 100 on the chip card 11. For forming the chip card reader 10 as shown in FIG. 5, a folding is carried out along foldline 41. The necessary spring elements 16 are here not shown.

The arrangement of the contact fields 31-34 on the flexible circuit board 14 is provided such that the chip card 11 (as shown in FIG. 5) can be inserted, for all practical purposes, in each desired position; i.e. in FIG. 5 the insertion is from the right, into the chip card reader 10. Always the necessary contact connections will be present. Each of the contact fields 1 to 8 and the appropriate conductive paths of the flex print 14 form a contact element of the chip card reader 10.

Lines 40 in FIG. 4 indicate that the flexible circuit board 14 can comprise a plurality of continuous pieces which will then be cut apart. Reference numeral 41' relates to a folding line 41 so as to realize the design of FIG. 5. In the flexible circuit board 14 connections in the form of conductive paths 50, 51, 52 and so on are provided which connect in a proper manner the contact areas 1 to 8 of the different contact fields 31–34; said connections in the form of conductive paths also provide (even though not shown) in a respective manner the connections leading towards the outside of the reader 10.

In accordance with the present invention the spring force is preferably generated by a metallic single piece spring element 16. The spring element 16 is relatively flat, i.e. it is a kind of a leaf spring; this allows the design of very flat chip card readers. Moreover, due to this design, the chip card reader 10 can be manufactured at low cost; it is, in particular, possible to provide for different contact arrangements at different locations so that the insertion of the card is possible in each direction. Preferably, the flex print or the flexible circuit board is coated on both sides and thus the chip can be shielded for the entire area.

Figure 6:
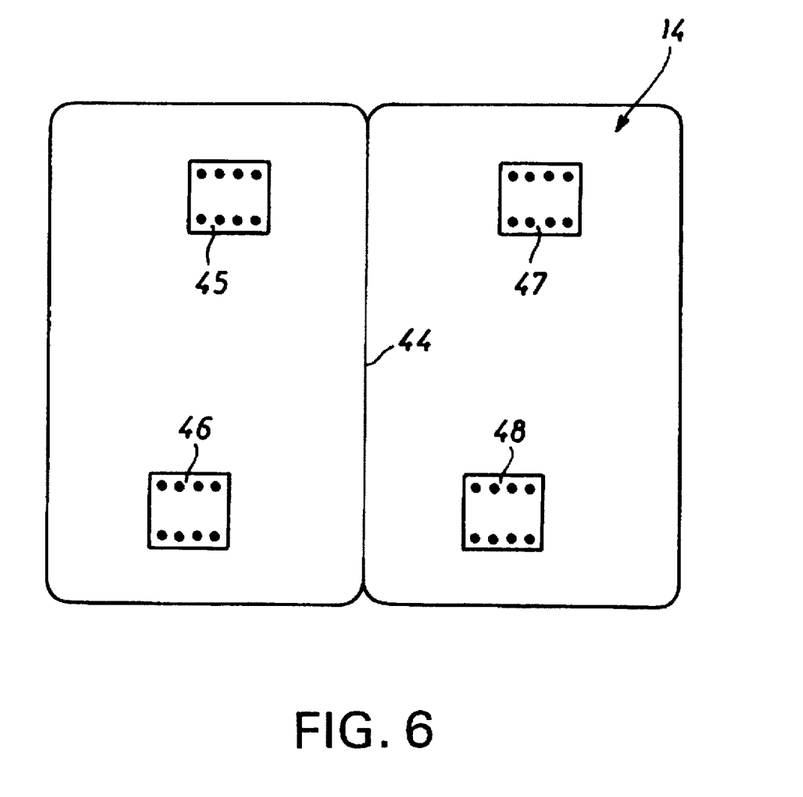
FIG. 6 is a plan view similar to FIG. 4 of a flexible circuit board designed in accordance with a third aspect of the invention.
Figure 7:
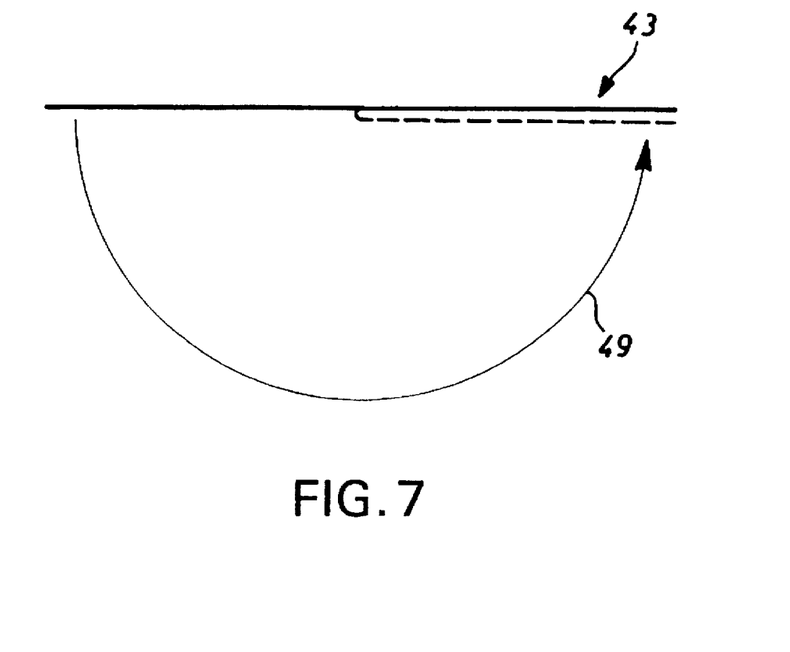
FIG. 7 is a side elevational view of the two circuit board halves shown in FIG. 6 which are now placed on top of each other for forming a universal chip card reader.
Figure 8:
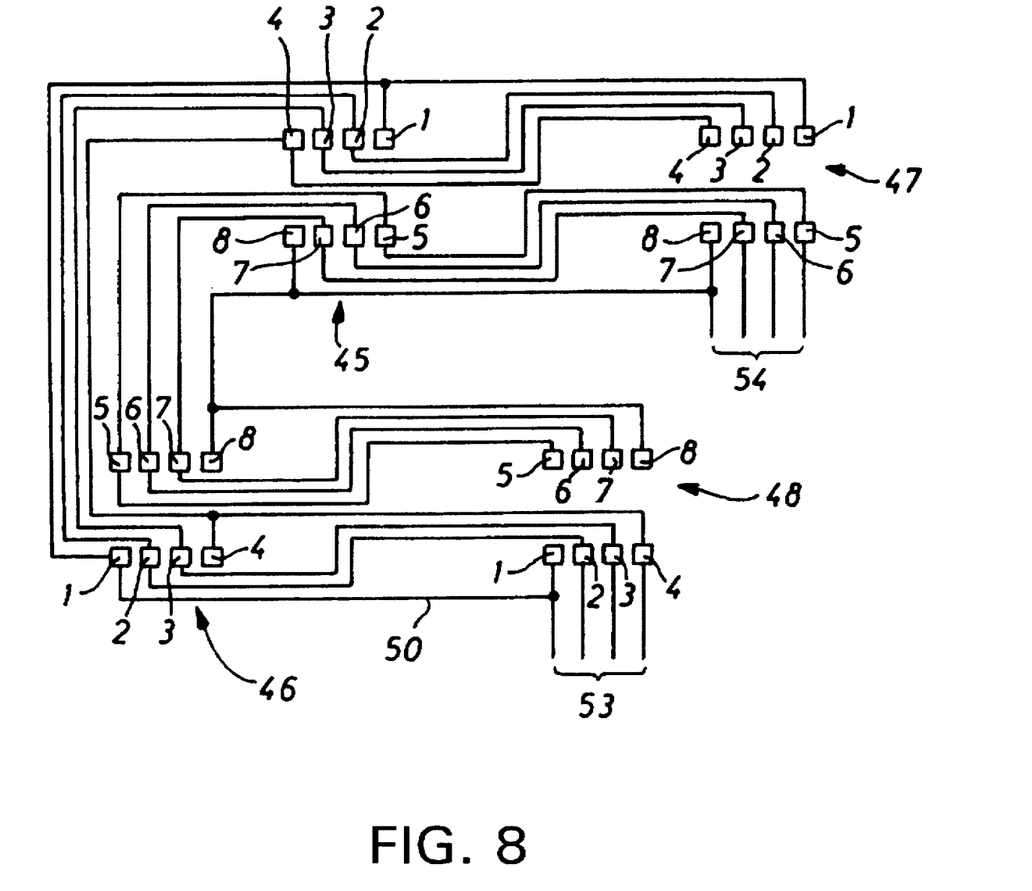
FIG. 8 shows the arrangement of the conductive or conductor paths of a flexible circuit board as it is used in the embodiment of FIGS. 6 and 7.

A third aspect of the invention is shown in FIGS. 6 through 8. Contrary to the representation of FIGS. 4 and 5, a flexible circuit board (flex print) 14 is not folded in longitudinal direction, but is folded in transverse direction. The flexible circuit board 14 comprises in accordance with FIG. 6 contact fields 45 through 48 which correspond to the contact fields 31–34 of FIG. 4. Each of said contact fields 45 through 48 comprises preferably eight contact areas 1 to 8, similar as it is shown in FIGS. 1 to 4. FIG. 8 shows said contact areas 1 to 8. The contact areas 1 to 8 of the different contact fields 45 through 48 are suitably connected, for instance in the manner shown in FIG. 8, i.e. by conductive paths 50 formed in the flex print. Outwardly extending terminations are referred to by reference numerals 53 and 54. With said terminations 53 and 54 the processing electronic is connected. Said processing electronic is adapted to process the information contained in the chip card 11.

FIG. 7 discloses how a chip card reader 43 is created by folding the flexible circuit board 14 along the folding line 44 and along an arc 49. This chip card reader 43 is suitable, in particular, for a chip card which can be inserted in transverse direction. Independent of the position of the chip card a contacting of the card contacts 100 of the chip card 11, is possible.

In the third embodiment of FIGS. 6 through 8 a spring element 16 in accordance with FIGS. 1 and 2 is provided similar to the embodiment of FIGS. 4 and 5, so as to provide properly functioning contact elements. Each of the contact elements of the chip card reader 10 as well as the contact elements of the chip card reader 43 are formed for all practical purposes by each one conductive paths and each one of the contact areas 1 through 8, wherein preferably a spring means is provided. The spring means are preferably in the form of a spring element 16 which is deformed in the manner as shown in FIG. 3 so as to form a contact cusp 20.

FIGS. 9 through 20 disclose a fourth embodiment in accordance with a fourth aspect of the invention, i.e. the use of a flexible circuit board (flex print) 59 in a card reader 56 having a movable carriage 58. Spring means 95 are used which act upon the circuit board 59 directly or indirectly.

FIGS. 9 through 20 show the chip card reader 56 as comprising as base portion 57 with a carriage 58 slidably mounted therein and adapted to move downwardly.

For guiding the carriage 58 in the base portion 57 guide means 60 (FIG. 15) are provided in the base portion 57 and guide means 75 (FIG. 14) are provided at the carriage 58. Said guide means 60 and 75 are preferably in engagement due to their shape and assure the movement of the carriage 58 from the insert position of FIG. 9 into the chip card reading position of FIG. 10.

Figure 16:
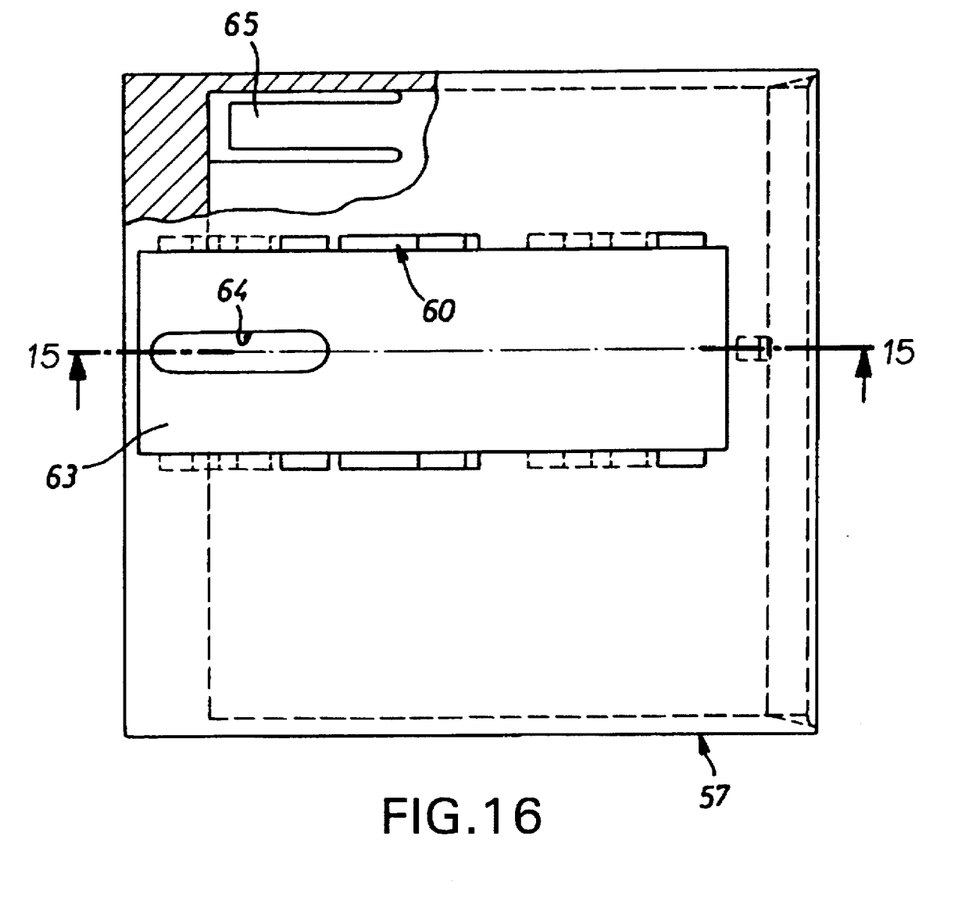
FIG. 16 a top plan view of a base portion of the chip card reader of FIG. 9.

The guide means 60 provided at the base portion 57 have preferably—see FIG. 16—the form of oppositely located recesses which are in engagement with pins 76 through 79 at the carriage 58. The base portion 57 comprises a bottom wall 63 within which about centrally but laterally offset, a slot 64 is provided, which serves to receive an arm 80 of the carriage 58. Moreover, a bottom wall 63 forms a card brake 65 in the form of a resilient arm so as to hold a chip card inserted into the reading position in said position during the reading process. Moreover, at the bottom wall 63 a locking means 66 is provided. Further, a back wall 57 is formed which can be used as an abutment for the chip card being in the reading position of the chip card reader.

Figure 14:
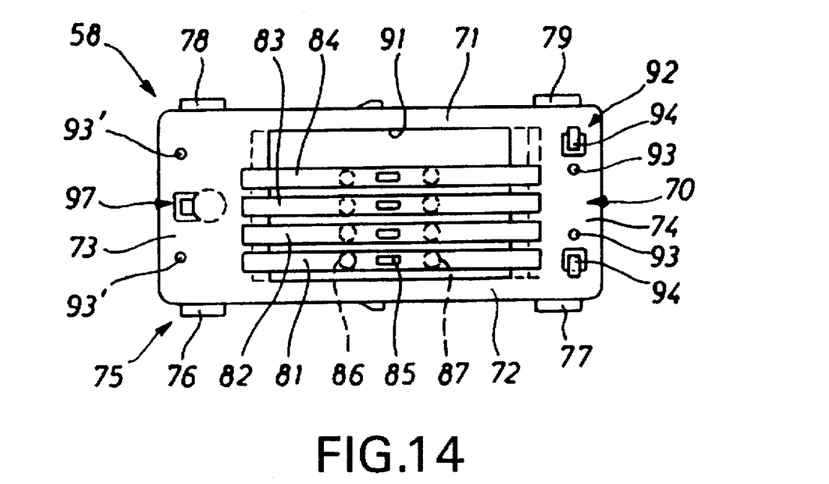
FIG. 14 a top plan view of a carriage of the chip card reader shown in FIG. 9.
Figure 15:
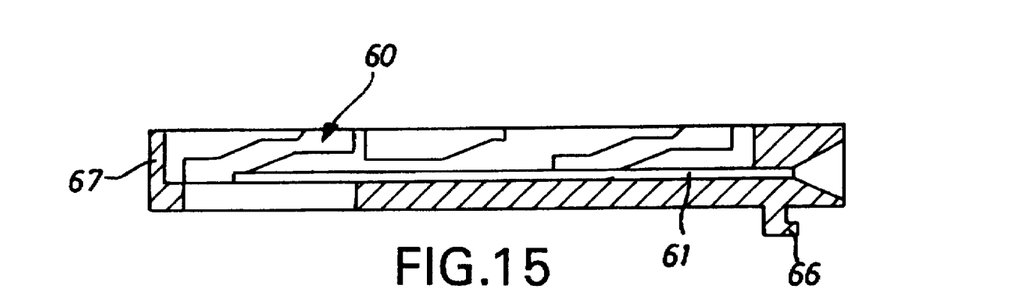
FIG. 15 a sectional view substantially along the line 15—15 in FIG. 16.

The carriage 58 comprises—see specifically FIG. 14—a frame 70. Said frame has a first longitudinal side portion 71, a second longitudinal side portion 72, a first transverse side portion 73 and a second transverse side portion 74. The guide means 75 of the carriage formed by pins 76 and 79 and the arm 80 which depends downwardly from the carriage 58 were already mentioned. Arm 18 serves for the connection to a spring 96 which is mounted with its other end at the locking means 66. Spring 96 biases the carriage 58 into the card insert position shown in FIG. 9. When the carriage 58 is moved from the position of FIG. 9 into the reading position shown in FIG. 10 due to the insertion of a chip card 11, then the spring 96 will be tensioned and has thus the tendency to move the carriage 58 backwardly towards the card insert position shown in FIG. 9. For instance by means of the frictional force of the brake, this movement will be blocked until the card 11 is pulled out of the reader through a guide slot 61 in the base portion 7.

Figure 13:
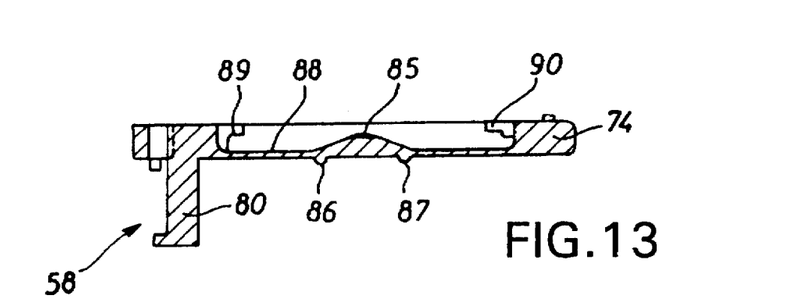
FIG. 13 a sectional view through a carriage, in substance along the longitudinal center line of FIG. 14.

As one can recognize in some detail in FIGS. 13 and 14, an opening 91 in the carriage 58 is partially covered by ribs 81 through 84. Preferably, the ribs 81 through 84 are formed together with the frame 30 of plastic material. Each of said ribs 81 through 84 comprises in its center a projection 85 which serves for the cooperation with spring means 95 yet to be described in detail. Opposite to the respective projections 85 extend noses 86 and 87 away from the ribs preferably symmetrically with respect to the respective projection 85. The noses 86 and 87 are adapted to touch the circuit board 59 so as to form the contact cusps 20 already mentioned. In the carriage 58 is a recess 88 which forms spring holding means. For this purpose there are preferably projections 89 and 90 present which hold or support spring means 95.

Moreover, the carriage 58 forms mounting means 92 for the flexible circuit board 14 or the flex print. Preferably, the carriage 58 and the mounting means 92 are formed together by injection moulding. The mounting means 92 comprise— more specifically two (see FIG. 14)—upwardly projecting pins 93 as well as two arms 94 which form together with the surface of the carriage 58 a receiving slot for the flexible circuit board 59. Opposite to said mounting means 92 the carriage 58 is provided with mounting means 97 which serve for the connection of an opening 100 of the flexible circuit board 59. Pins 93' and 94' serve for receiving openings 113 of the circuit board 59.

The spring means 95 is preferably in the form of a leaf spring 99 which comprises four ribs 101, 102, 103 and 104 which cooperate with respective ribs 84, 83, 82 and 81. Transverse ribs 105 connect the ribs 101 through 104 at the transverse sides. The leaf spring 99 is preferably of a generally planar design.

The leaf spring 99 is inserted into the recess 88 preferably such that a force is transmitted to the projections 85, such that the noses 86, 87 are pressed downwardly from the rest position shown in FIG. 13. The noses 86, 87 in turn, press against the flexible circuit board 59 preferably at a location where the contact areas 1 through 8 are located.

FIGS. 17 through 20 show in detail a preferred flexible printed circuit board 59 (flex print). The flexible circuit board 59 is provided with a plurality of conductive paths 111. The conductive paths 111 are provided with conductive path extensions 112 preferably at a location where the contact areas 1 through 8 are. In the area of said conductive path extensions 112 there are preferably contact locations 120 formed which have preferably a circular cross-section, as will be explained below. Said contact locations 120 form contacts which are adapted to contact the contacts of a chip card. The conductive paths 111 end in terminations 115 to which a processing circuit can be connected.

Figure 19:
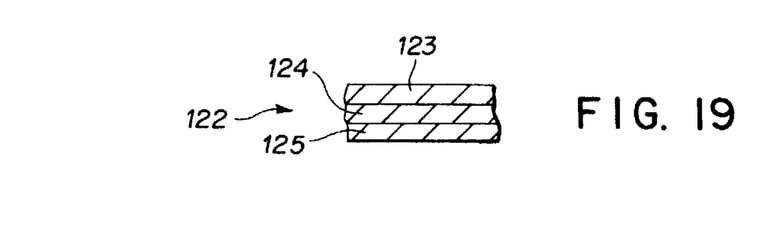
FIG. 19 a schematic view of a portion of a cover foil of the flex print.
Figure 20:
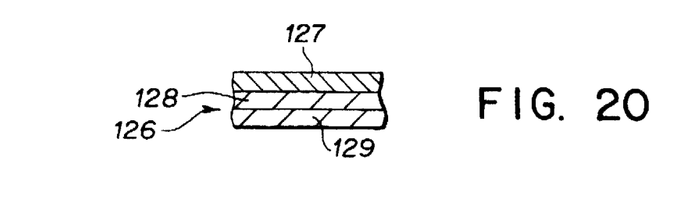
FIG. 20 a schematic side elevational view of a portion of a base foil of the flex print of FIG. 18.

FIGS. 19 and 20 discloses that the circuit board 59 comprises preferably a cover foil 122 and a base foil 126. The cover foil 122 comprises in turn a polyimid layer 123, an adhesive layer 124 and a protective foil 125. The base foil 126 comprises a copper layer 127, an adhesive layer 128 and polyimid layer 129. The design of said circuit board 59 differs also with respect to the terminology, somewhat from the circuit board 14 shown in FIG. 3.

In the area of the contact locations 120 the cover foil 122 is not existent, so that the copper layer 127 is accessible. This is schematically shown in detail in FIG. 17. Here, one can see an interruption of the cover foil 122 and one can see the copper layer 127 referred to by the dashed line. Preferably, the copper layer 127 is thicker in the area of the contact location 120. Also, it is possible to provide in this area a gold or silver layer. The flexible circuit board 59 will preferably be formed in the manner shown in FIG. 17 for instance by coining such that a contact cusp 20 is formed. Thus, the contact cusp 20 is formed without relying on the force which is for instance generated by the spring element 133. The spring element, for instance the spring element 133, still has the task to provide the preformed contact cusp 20 with the necessary resiliency, so as to obtain a safe contact with the card contacts of the chip card.

Figure 9:
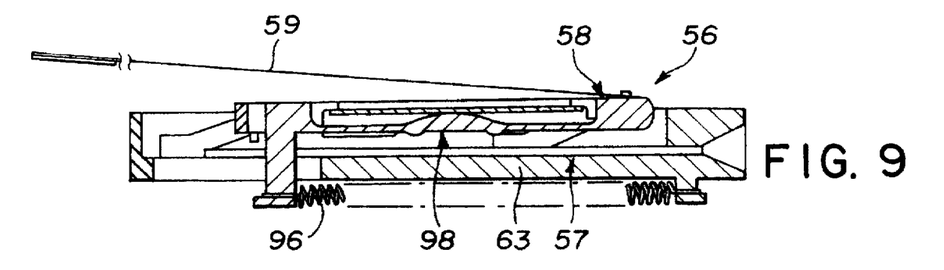
FIG. 9 is a longitudinal sectional view of a chip card reader in accordance with a fourth aspect of the present invention, wherein the section line extends in substance along the longitudinal center line in FIG. 11.
Figure 10:
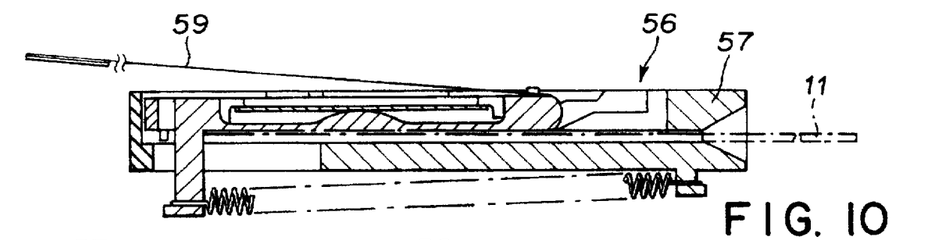
FIG. 10 a sectional view similar to FIG. 9 but in a card reading position.
Figure 11:
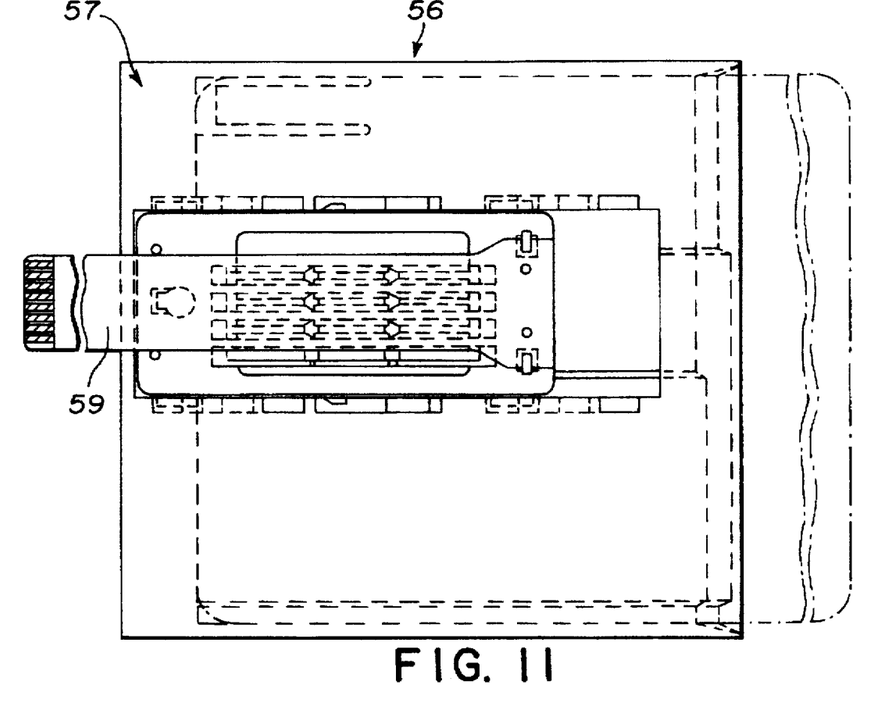
FIG. 11 a schematic plan view of the chip card reader of FIGS. 9 and 10.
Figure 12:
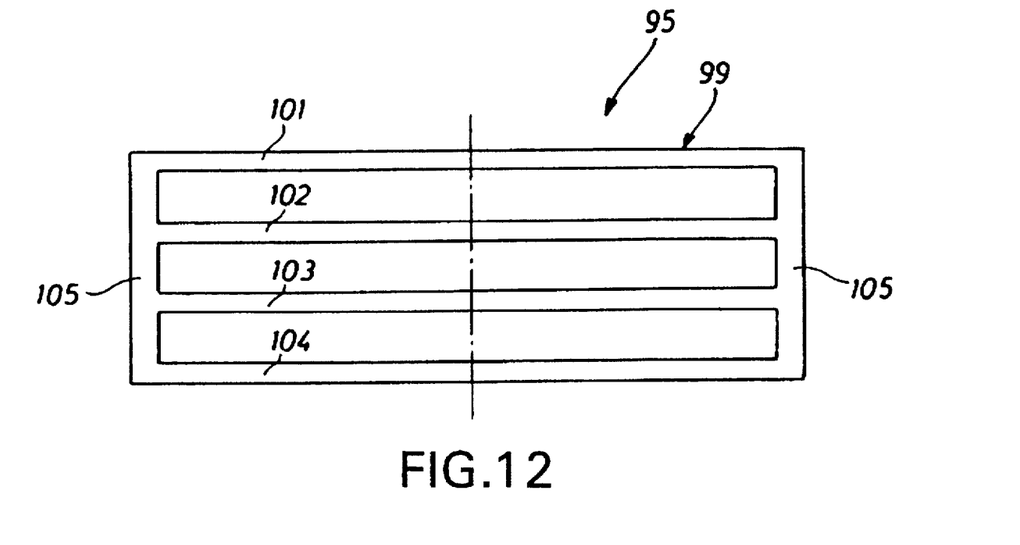
FIG. 12 a plane view of a spring element as it is used for a chip card reader of FIGS. 9 to 20.
Figure 18:
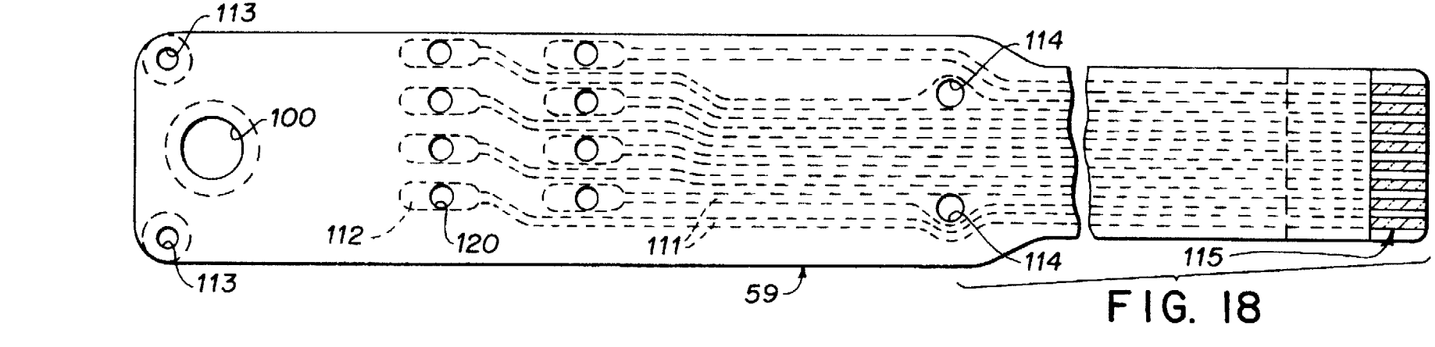
FIG. 18 a top plan view of the flex print in accordance with FIG. 17.

The mounting of the flexible circuit board 59 at the carriage 58 is clear for the skilled person based on the preceding description. The end of the flexible circuit board 59 shown on the left-hand side of FIG. 18 is held at the bottom side of the carriage 58 by means of the arm 80 which is in engagement with the opening 100; the openings 113 of the circuit board 59 are located around the pins 93', 94'. Then, the circuit board 59 extends over the noses 86 and 87 and is guided around the right end of the carriage 58 so as to be held at the upper surface of the carriage 58 as well as the pins 93, with said pins projecting into the openings 114 of the circuit board 59. From there the circuit board 59 extends, as is shown in FIG. 9, to the processing circuit adapted to be connected to the chip card reader. Due to the fact that the flexible circuit board 59 extends in a tensioned manner about the bottom side of the carriage 56, and due to the fact that the ribs 81 through 84 are tensioned by the spring means 95, the noses 86, 87 will press from the inside against the contact cusps 20 so that the contact cusps are in a resilient engagement with the respective card contacts in the reading position of FIG. 10.

FIGS. 21 through 33 disclose a fifth aspect or a fifth embodiment of the invention in accordance with which the chip card reader 130 is provided which comprises static frame or housing means 140 as well as contact pressing means 141 which are preferably perpendicularly movable with respect to the chip card 11. In accordance with a preferred embodiment of the invention, spring means 142 are provided which cooperate in particular with a flexible circuit board 14.

Figure 29:
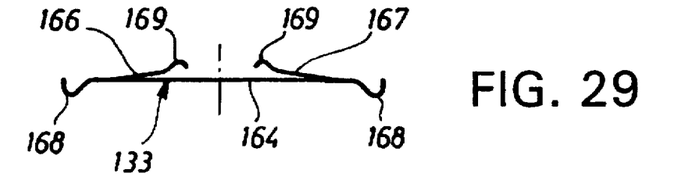
FIG. 29 a side elevational view of a spring element of FIG. 30.
Figure 30:
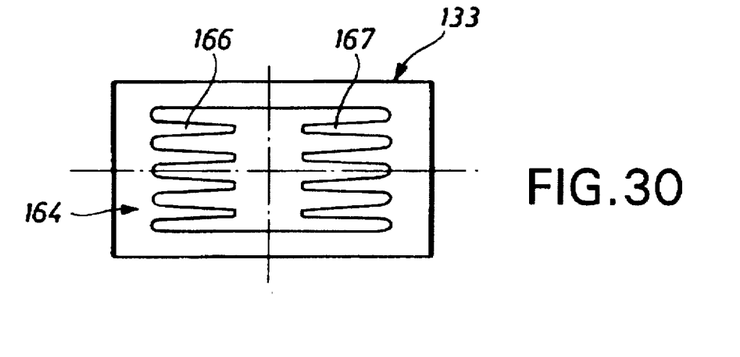
FIG. 30 a top plan view of the spring element of FIG. 29.

The frame or housing means 140 comprise preferably a frame 131 and a cover 134. The cover 134 is fixedly mounted to the frame 131. The spring means 142 are preferably in the form of a spring element 133 (FIGS. 29, 30). The spring element 133 is preferably of a single piece design and is preferably made of metal. The spring element 133 comprises a spring frame 164 from which spring arms 166, 167 extend in a comb-like manner and facing toward each other. The spring arms 166, 167 are preferably provided with cusps 169 as shown in FIG. 29. The cusps 169 are provided for abutment with a flex print 14. The spring frame 64 further forms on its two oppositely located sides each one generally U-shaped cusp like groove 168 or else individual cusps.

Figure 31:
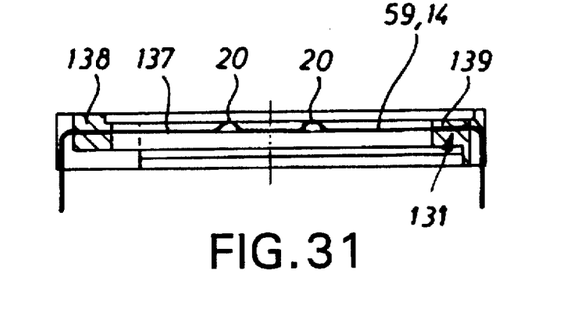
FIG. 31 a schematic side elevational view along the line 31—31 in FIG. 32.
Figure 32:
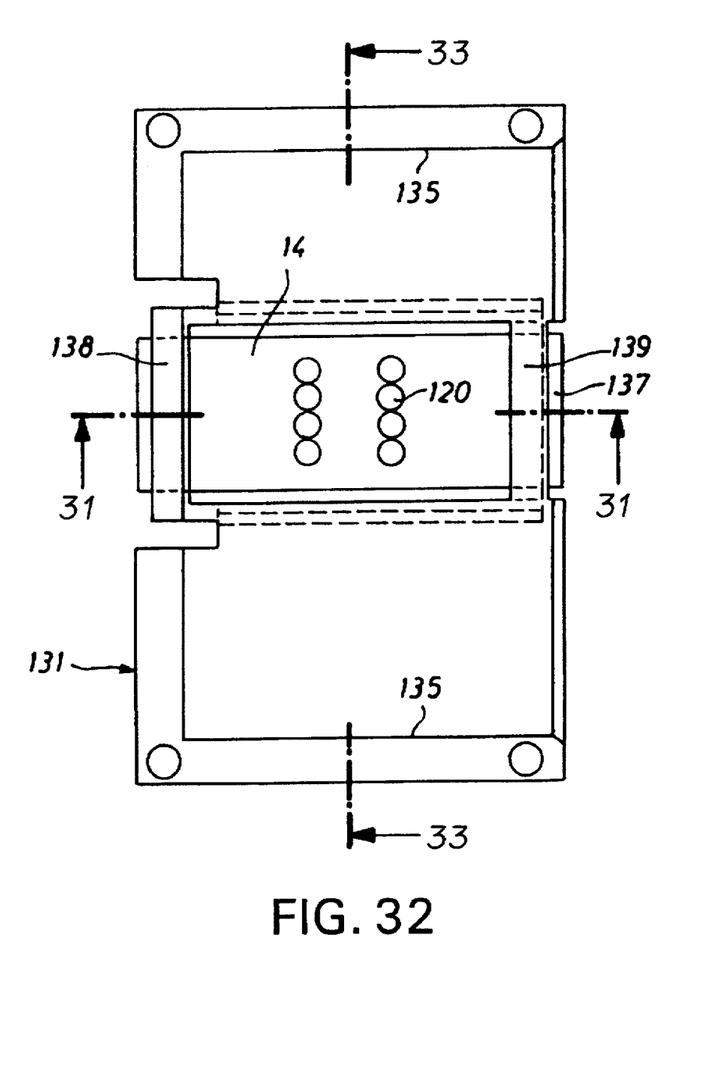
FIG. 32 a top plan view onto the frame of the chip card reader of FIG. 21.
Figure 33:
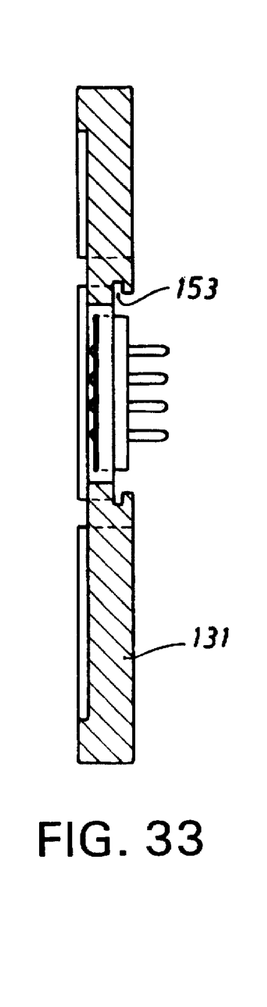
FIG. 33 a schematic sectional view along the line 33—33 in FIG. 32.

The frame 131 as shown in detail in FIGS. 31 through 33 forms two oppositely located guide walls 135 for the side edges of the chip card and the frame further forms a guide surface 136 (FIG. 24) so to speak on the upper side of the frame 131. Further, two spaced ribs 138 and 139 are provided in a single piece design with the frame 131. Said ribs 138 and 139 serve for the support of a flexible circuit board 59 or 14 and specifically for the tensioning of the same.

Figure 17:
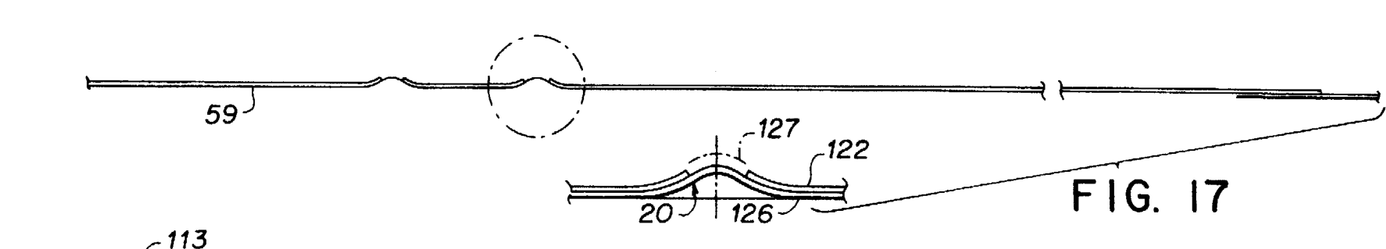
FIG. 17 a schematic side elevational view of the flex print shown in FIG. 18.
Figure 26:
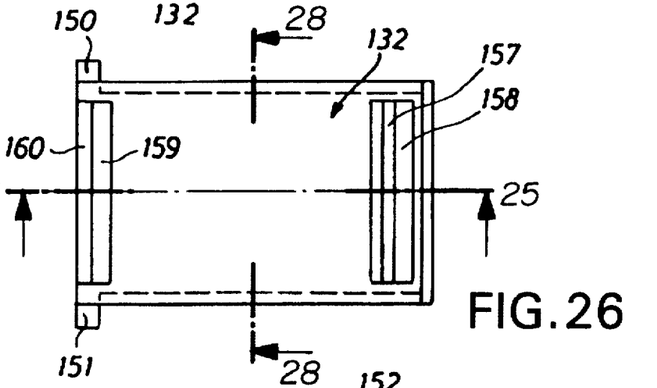
FIG. 26 a top plan view of a pressure plate of the chip card reader of FIG. 21.
Figure 27:
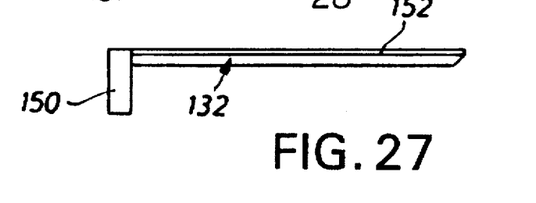
FIG. 27 a side elevational view of the pressure plate of FIG. 26.
Figure 28:
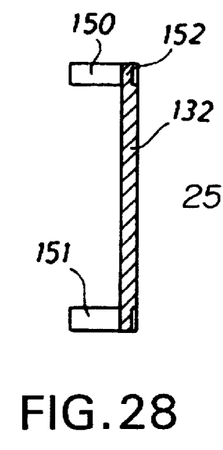
FIG. 28 a sectional view along line 28—28 in FIG. 26.

In FIGS. 25 through 28 the pressure plate 132 is shown in detail. The pressure plate comprises at its left end as shown in FIG. 26 (two) abutments 150, 151. The abutments preferably extend in FIG. 26 upwardly and cooperate with the front edge of a chip card being inserted, so as to cause a movement of the pressure plate 132 from the position shown in FIG. 21 into the (reading) position shown in FIG. 22. It can be recognized that this movement of the pressure plate 32 presses a portion of the spring element 132 perpendicularly towards the card and also upwardly (see FIGS. 21, 22) and causes thereby that the contact locations 120 of the contact elements of the chip chard reader 130 contact with the card contacts 120 of the chip card 11. In the embodiment as shown the contact elements of the chip card reader 130 are preferably formed by the flexible circuit board 14 which comprises for this purpose similar to what is shown in FIGS. 17 and 18 conductive paths 111 and contact cusps 20. Said contact cusps 20 will be pressed with their contact locations 120 against the card contacts 20 when moving from the position of FIG. 21 into the position of FIG. 22.

Even though the contact elements of the chip card reader 130 are here realized by a flexible circuit board 14, it is in accordance with the present invention also possible to provide for a movement of the contact elements substantially perpendicular to the surface of the chip card carrying the card contacts when the contacting has to be made with the chip card contacts.

The pressure plate 132 is, in some more detail, provided at its both longitudinal sides with guide rails 152 which can be inserted into a guide 153 in the frame 131 as is shown in FIG. 133. At the upper side or support surface 55 for the spring element 133 are lifting means 162 for the pressure plate 132. Said lifting means will at least partially lift the spring element 133 when the pressure plate 132 is moved. Due to the lifting of the spring element 133 or its spring frame 164, the spring arms 166 and 167 will press with their cusps 169 against the flexible circuit board 14 in the region of the contact areas 1 through 8 so that said contact areas obtain a safe contact engagement with the card contacts of the chip card 11.

In accordance with the present invention the lifting means 162 are preferably formed by an indentation 157 and oppositely thereto by an indentation 160 in the pressure plate 132. Inclined surfaces 158 and 159, respectively, provide for a safe upward movement and guidance of the grooves or cusps 168 so that they will lie on the upper surface, i.e. the support surfaces 155 and 156, respectively of the pressure plate 132.

Figure 21:
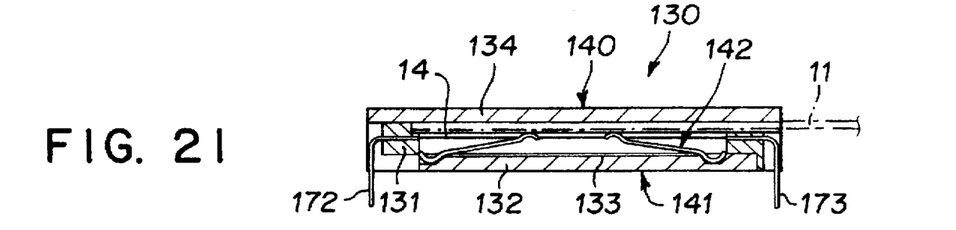
FIG. 21 a schematic longitudinal sectional view of a chip card reader in accordance with a fifth aspect of the invention.
Figure 22:
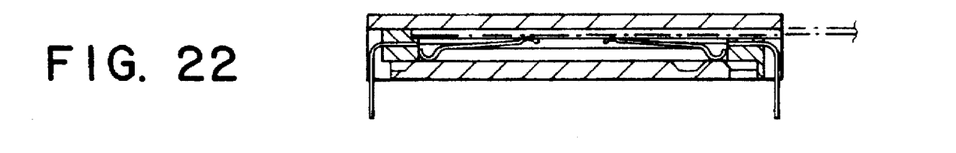
FIG. 22 a side elevational view of the chip card reader similar to FIG. 21 and showing the chip card here in its reading position.
Figure 23:
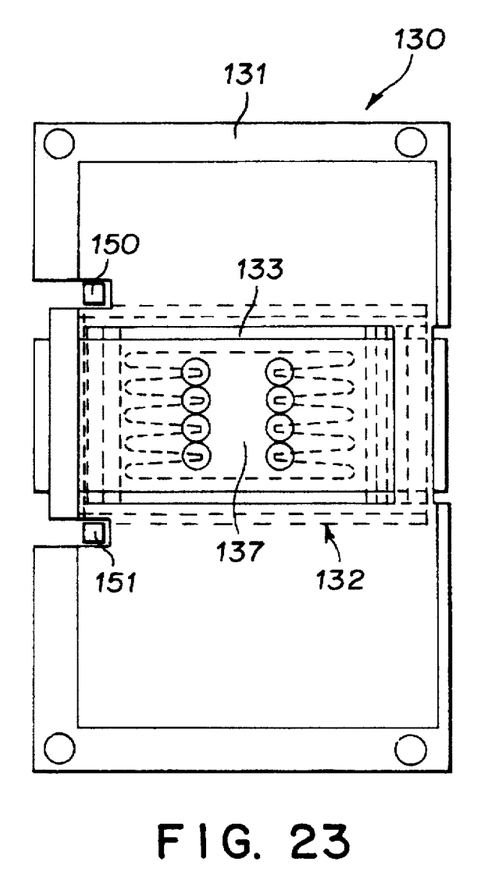
FIG. 23 a plan view of the chip card reader of FIG. 21.
Figure 24:
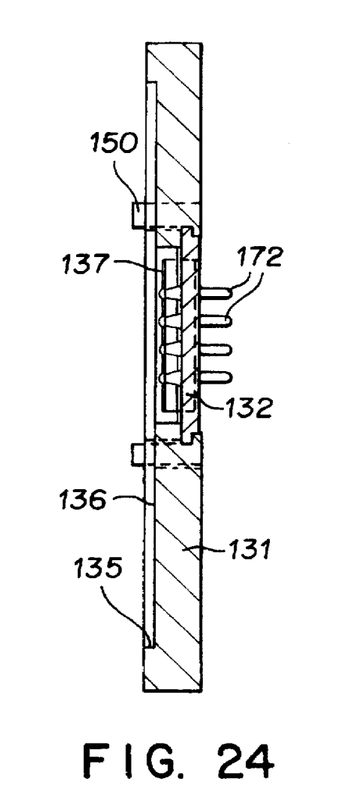
FIG. 24 a schematic sectional view transverse to the longitudinal axis of the chip card reader of FIG. 23.
Figure 25:
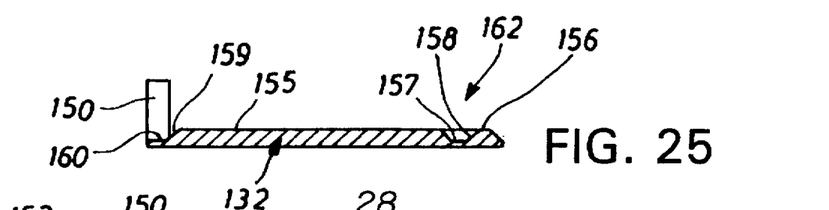
FIG. 25 a sectional view along the line 25—25 in FIG. 26.

In the embodiment shown the circuit board is provided with oppositely located terminations 172, 173 (see FIG. 21).

Figure 34:
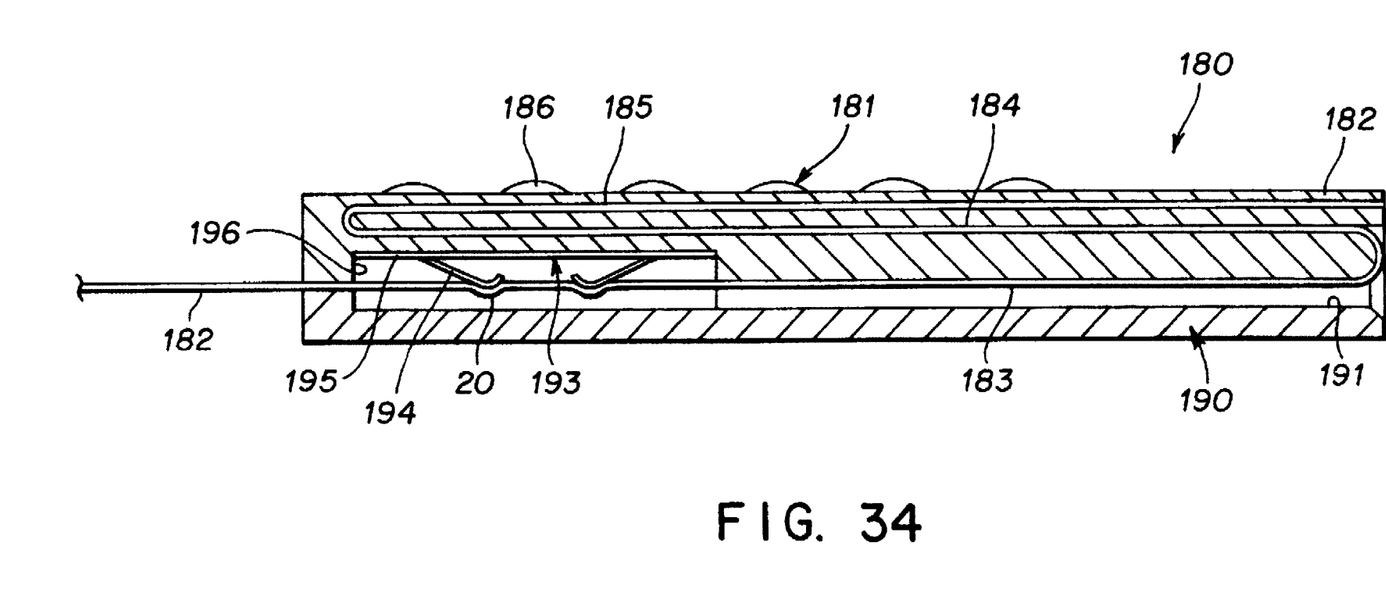
FIG. 34 a longitudinal section of a chip card reader having an integrated foil key board in accordance with a sixth aspect of the invention.

FIG. 34 discloses a sixth embodiment of the invention, i.e. a chip card reader 180 which uses a flexible circuit board or a flex print 182 together with a key board 181. An insert slot 191 for a chip card is formed in a housing 190. A spring element 193 is held in a chamber 196 of the housing 190. The spring element 193 comprises arms 194 which contact the flex print 82 in the manner described above, so as to form contact elements with contact cusps 20.

The flex print 182 extends beyond the chamber 196 by a flex print portion 183 and in particular by a flex print portion 184 extending parallel thereto, so as to end enventually in a flex print portion 185 which is designed such that it forms the key board of the foil key board. The key board 181 comprises keys 186 so that a key board results which is integrated with the chip card reader 180.

I claim:

1. A universal chip card reader and a universal SIM card reader, respectively comprising electrical contact elements for engaging said chip card,
   wherein said contact elements are arranged in contact fields on a flexible circuit board,
   wherein the flexible circuit board is folded to permit said contact elements to engage both sides of a respective chip card or SIM card, and
   wherein the chip card and SIM card are adapted to be inserted in any desirable direction into the respective card reader.

2. A universal chip card reader and universal SIM card reader, respectively, according to claim 1, wherein the flexible circuit board is folded in a transverse direction relative to conductive paths in said flexible circuit board.

3. A universal chip card reader and a universal SIM card reader, respectively, according to claim 1, wherein the flexible circuit board is folded in longitudinal direction relative to contact paths on the flexible circuit board.

4. A chip card reader as set forth in claim 1, wherein said contact elements are biased by spring means which exert a spring force against the contact elements.

5. A chip card reader as set forth in claim 1, wherein for each of the contact fields of the flexible circuit board, a single metal spring is provided.

6. A chip card reader according to claim 5, wherein the metal spring presses indirectly against the circuit board.

7. A chip card reader as set forth in claim 1, wherein the circuit board is guided around a carriage, the carriage being guided in a frame of the chip card reader such that it is lowered towards a reading position during insertion of a chip card.

8. A chip card reader according to claim 7, wherein the carriage comprises ribs which are biased towards the flexible circuit board by means of a spring element.

9. A chip card reader as set forth in claim 1, wherein the flexible circuit board includes cusps in the area of said contact elements.

10. A chip card reader according to claim 9, wherein the contact elements are formed from an exposed metal layer in said flexible circuit board, and wherein the exposed metal layer is reinforced by another metal layer.

11. A chip card reader according to claim 10, wherein the metal layer exposed in the area of the contact location is coated with a gold layer.

12. A chip card reader according to claim 1, wherein the contact elements, when inserting the chip card, are moved on said chip card contacts in a direction substantially perpendicular to the surface of the card.

13. A chip card reader as set forth in claim 1, further comprising a frame and a pressure plate, the pressure plate being provided with spring means so as to press against the flexible circuit board and thereby press contact elements on the circuit board against card contacts on the chip card.

14. A chip card reader according to claim 13, wherein the pressure plate comprises means to provide for a lifting movement of the spring means.

15. A chip card reader according to claim 13, wherein said frame is arranged to tension the flexible circuit board.

16. A chip card reader according to claim 1, wherein the flexible circuit board comprises an integrated foil key board.

* * * * *

UNITED STATES PATENT AND TRADEMARK OFFICE
CERTIFICATE OF CORRECTION

PATENT NO. : 5,726,432
DATED : 3-10-98
INVENTOR(S) : Manfred REICHARDT

It is certified that error appears in the above-identified patent and that said Letters Patent is hereby corrected as shown below:

In column 6, line 64, after "carriage 58" insert --between the arms 94 and the upper side of the carriage 58--

Signed and Sealed this

Second Day of June, 1998

Attest:

BRUCE LEHMAN

*Attesting Officer*       Commissioner of Patents and Trademarks